Aug. 27, 1935.                J. W. McNAIRY ET AL                2,012,824
                                 CONTROL SYSTEM
                                 Filed Dec. 1, 1934
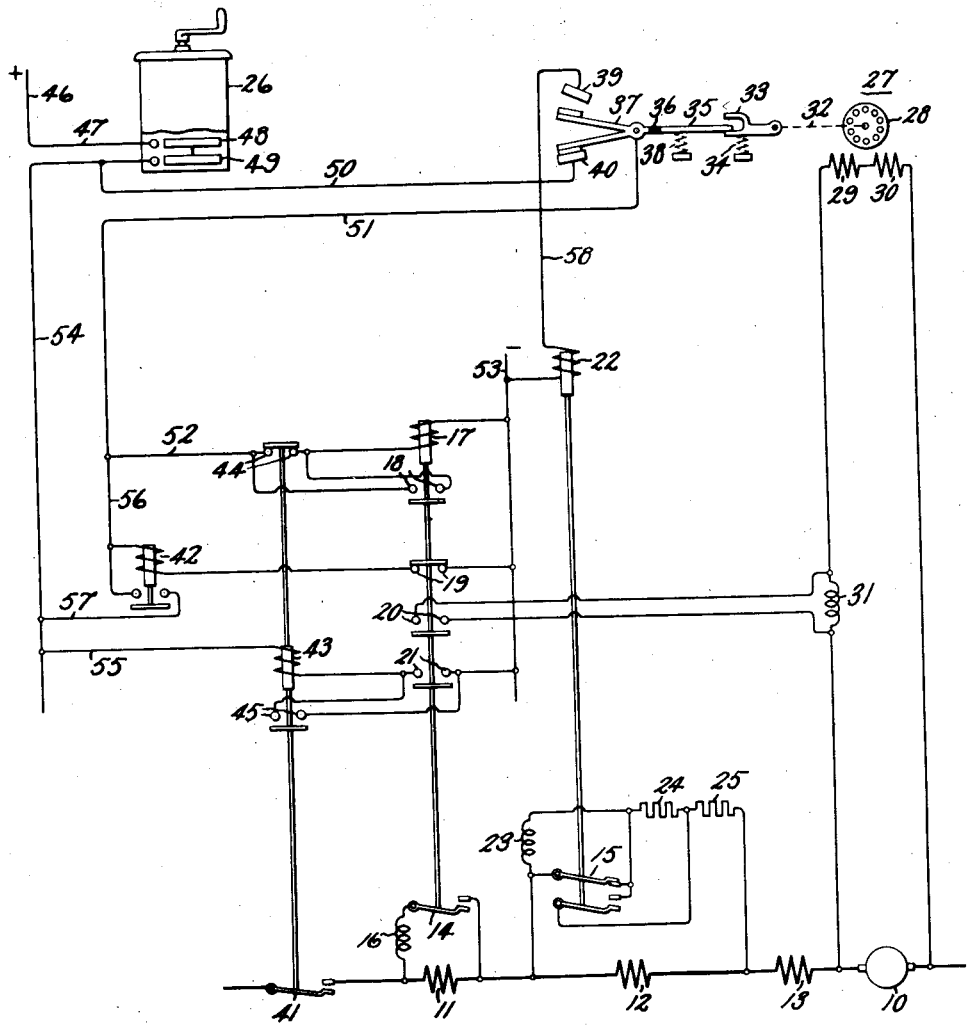
Inventor:
Jacob W. McNairy,
Harold G. Moore,
by Harry E. Dunham
His Attorney.

Patented Aug. 27, 1935

2,012,824

UNITED STATES PATENT OFFICE 2,012,824

CONTROL SYSTEM

Jacob W. McNairy, Erie, and Harold G. Moore, Wesleyville, Pa., assignors to General Electric Company, a corporation of New York Application December 1, 1934, Serial No. 755,558

17 Claims. (Cl. 172—289)

Our invention relates to control systems, more particularly to systems for exercising a plurality of control functions in predetermined sequence and has for an object the provision of a simple and reliable relay system for accomplishing such sequential control in response to predetermined operating conditions of the device to be controlled.

In controlling the operation of various types of energy translating devices, such as electric motors, it is often desirable, in order to obtain satisfactory operation, to accomplish the proper control by means of a plurality of definite control steps, each control step being initiated upon the attainment of a predetermined operating condition of the device. For example, in the operation of electric motors, it may be desirable to vary the field excitation thereof in predetermined steps as the motors are accelerated. A particular instance of the desirability of such control is found in the acceleration of single-phase motors of the commutator type. Improved commutation of such motors throughout the accelerating range may be obtained by accelerating the motors from standstill to a predetermined speed with reduced field excitation, by accelerating the motors to a second speed with full field excitation and finally, by shifting the phase relation of the interpole field excitation at a predetermined higher motor speed.

Various relay systems have heretofore been provided for accomplishing such sequential control by means of a plurality of relays responsive to an operating characteristic of the device to be controlled, each of the relays being arranged to operate at a different predetermined operating condition of the device. Much is yet to be desired, however, in a simple and reliable control system of this type. Accordingly, it is a further object of our invention to provide a simple and reliable relay system in which a single relay arranged to be successively responsive to the attainment of a plurality of operating conditions is effective selectively to actuate a plurality of control devices.

In carrying out our invention in one form, we provide a control system which includes a plurality of control devices and a two-position relay arranged to be responsive to a predetermined operating condition of the device to be controlled to actuate one of the control devices, together with means controlled by an operation of the relay for returning the relay to its first position and for rendering the relay responsive to a second operating condition, the second operation of the relay then being effective to actuate another of the control devices. Means are also provided for preventing operation of the control devices out of predetermined sequence. More specifically, we provide a voltage relay connected for energization in accordance with the armature voltage of a motor and arranged to respond to the attainment of a predetermined armature voltage to actuate one of a plurality of field control devices, and means actuated by the one control device for inserting additional impedance into the energizing circuit of the voltage relay to render the relay responsive to another value of armature voltage. Selective means are provided for actuating another of said control devices upon a second operation of the relay and for preventing actuation of the control devices out of predetermined sequence.

For a more complete understanding of our invention, reference should now be had to the drawing, the single figure of which is a diagrammatic illustration of a control system embodying our invention.

Referring now to the drawing, we have shown our invention in one form as applied to a single-phase alternating-current commutator motor 10 having a main exciting field winding 11, an interpole field winding 12 and a compensating field winding 13. In order to control the field excitation of the motor 10 in the desired sequence of steps during the accelerating period, a pair of control devices or contactors 14 and 15 are provided. The contactor 14 is arranged selectively to connect an impedance 16 in parallel circuit relation with the exciting field winding 11 and is provided with an operating winding 17 and a plurality of interlock contacts 18, 19, 20 and 21 respectively. The contactor 15 is provided with an operating winding 22 and is arranged as shown selectively to vary the circuit connections of a reactance 23 and resistances 24 and 25 to vary the effective impedance of a shunt circuit around the interpole field winding 12 and thus control the phase relation and magnitude of the interpole field current. When in the position shown, its operating winding 22 being deenergized, the contactor 15 establishes a short circuit around the reactance 23 while the resistances 24 and 25 are connected in series with each other across the interpole field winding 12. When the contactor 15 is moved to its uppermost position by energization of its operating winding 22, it opens the short circuit around the reactance 23 and short-circuits the resistance 24, thus connecting the reactance 23 and the resistance 25 in series with each other across the interpole field winding. It will thus be observed that the reactance 23 and the resistance 24 are selectively short-circuited.

A controller 26, shown as a conventional drum type controller, is provided for accelerating the motor 10. While the circuit connections and apparatus for supplying energy to the motor through the controller from a suitable single-phase alternating current source have been omitted in order to simplify the drawing, it will be understood that any suitable apparatus may be provided for that purpose, such as that disclosed in Patent No. 1,972,688 to McNairy and Pritchard.

It is important that the desired changes in field excitation shall be caused to take place as the motor 10 attains definite predetermined conditions, for example, predetermined speeds, and accordingly, we provide a voltage relay 27 of the split-phase, shaded pole, induction motor type having an operating element 28 movable between two positions and operating windings 29 and 30 connected for energization in accordance with the voltage across the motor armature, which voltage varies substantially as the speed of the motor during the acceleration period. An impedance 31 is arranged selectively to be connected in series circuit relation with the operating windings 29 and 30 or to be short-circuited by the interlock 20 in order to vary the voltage setting of the relay 27.

It will be observed that the operating element 28 is provided with an operating shaft 32, indicated by the broken line, connected to an operating yoke 33, the yoke 33 being biased by means of a spring 34 against movement in a counter-clockwise direction. Cooperating with the yoke 33 is an operating rod 35 connected through an insulating portion 36 to a pivoted contact or switch member 37. A biasing spring 38 is arranged normally to maintain the contact member 37 in one of two positions. Arranged adjacent the movable contact 37, we provide a pair of fixed contacts 39 and 40, the contacts 37 being movable therebetween to engage one or the other of the fixed contacts 39 and 40 without overlapping. As shown, the member 37 is biased by the spring 38 into engagement with the contact 40. Our improved control system also includes a line contactor 41 for controlling the energizing circuit of the motor 10 and an auxiliary relay 42, the line contactor 41 being provided with an operating winding 43 and with interlock contacts 44 and 45.

With the above description of the principal elements in mind, it is believed that a complete understanding of our invention may now be had from the description which follows of the operation of the system as a whole.

In general, when the controller 26 is moved to its first position, the operating windings 17 and 43 are energized to close the shunt controlling contactor 14 and the line contactor 41. As the motor begins to accelerate under reduced exciting field and with the resistances 24 and 25 connected in shunt across the interpole field winding 12, the operating windings 29 and 30 of the relay 27 are energized in accordance with the voltage across the armature of the motor 10. It will be observed that when the contactor 14 is in its circuit closing position, a short circuit is imposed upon the impedance 31 by the interlock contacts 20, and the relay 27 is accordingly responsive to a relatively low voltage which corresponds to the speed at which it is desired to change over to full field excitation. When the motor 10 attains this predetermined speed, the relay 27 operates to move the contact member 37 to its second or uppermost position and the field controlling contactor 14 opens, whereby full field excitation is applied to the motor 10. Operation of the contactor 14 to this position opens the interlock contacts 20, thereby inserting the impedance 31 into the energizing circuit of the operating windings 29 and 30. The relay 27 is thereby rendered responsive to a second predetermined higher motor speed, and the torque exerted by the windings 29 and 30 is so decreased as to permit the biasing springs 34 and 38 to return the operating elements of the relay to normal position. When the motor 10 attains the speed at which it is desired to shift the phase relation of the interpole field excitation, the relay 27 operates again and the field controlling contactor 15 is actuated to vary the circuit connections of the reactance 23 and the resistances 24 and 25. The desired sequence of field control steps having now been performed, the motor 10 may be accelerated to the desired running speed without further change in its field excitation. The details of the selective circuits for obtaining the above sequence of operation will now be described in order that a full understanding of our invention may be had.

Assuming that the motor circuit is deenergized and that the various control elements are in the position shown in the drawing, when the controller 26 is moved to its first notch or position to initiate operation, a circuit is established for energizing the winding 17 to close the field controlling contactor 14 and the interlocks 18, 20 and 21 carried thereby. This energizing circuit may be traced from the positive control bus 46 through the conductor 47, the controller segments 48 and 49, the conductor 50, the relay contacts 40 and 37, the conductors 51, and 52, the interlock contacts 44 and the operating winding 17 to the negative control bus 53. In its closed position the contactor 14 serves to connect the impedance 16 in parallel circuit relation with the exciting field winding 11 to reduce the field excitation of the motor 10 during starting, and the interlock contacts 18 are arranged to bypass the interlock contacts 44, which are arranged in the energizing circuit of the winding 17 to prevent initial energization of the contactor 14 when the line contactor 41 is in closed circuit position, in order that the operating winding 17 may remain energized upon the subsequent closing of the line contactor 41. The interlock contacts 20, as pointed out above, impose a short circuit upon the impedance 31 to render the relay 27 responsive to a relatively low value of armature voltage, and the interlock contacts 21 complete an energizing circuit for the operating winding 43 which may be traced from the positive control bus 46 through the conductor 47, the controller segments 48 and 49, the conductor 54, the conductor 55, the operating winding 43 and the interlock contacts 21 to the negative control bus 53. Energization of the winding 43 actuates the line contactor 41 to its circuit closing position, the interlock contacts 45 serving to bypass the interlock contacts 21 in order that the winding 43 may remain energized when the contactor 14 subsequently opens, and the motor 10 thereupon begins to accelerate under reduced field excitation.

When the motor 10 reaches the speed at which it is desired to change over to full field excitation, the operating element 28 of the relay moves in a counterclockwise direction against the force exerted by the biasing springs 34 and 38 to move the contact member 37 out of engagement with the fixed contact 40 and into engagement with the fixed contact 39. This disengagement of the contacts 37 and 40 opens the energizing circuit for the winding 17 whereby the contactor 14 opens to apply full field excitation to the motor 10 and the interlock contacts 18 open to prevent reenergization of the winding 17 when the contact member 37 is returned to normal position by the biasing springs 34 and 38 against the decreased torque which is now exerted by the operating windings 29 and 30, due to the insertion of the impedance 31 into the relay energizing circuit by the interlock contacts 20. The momentary engagement of the relay contacts 37 and 39 which are connected in circuit with the winding 22 is ineffective upon this first operation of the relay to energize the winding 22, due to the open circuit position of the auxiliary relay 42, an energizing circuit for which is partially completed by the interlock contacts 19.

With the impedance 31 in circuit with the operating windings 29 and 30, the relay contact 37 is returned to its normal position and the relay is responsive to a higher value of armature voltage corresponding to the motor speed at which it is desired to shift the phase relationship of the interpole field excitation. Reengagement of the relay contacts 37 and 40 when the relay returns to its normal position completes an energizing circuit for the auxiliary relay 42 which may be traced from the positive control bus 46 through the conductor 47, the controller segments 48 and 49, the conductor 50, the relay contacts 40 and 37, the conductors 51 and 56, the winding 42 and the interlock contacts 19 to the negative control bus 53, and the contacts of the relay 42 close, partially to complete an energizing circuit for the winding 22.

When the motor attains the predetermined higher speed at which it is desired to shift the phase relation of the interpole field excitation, the relay contact 37 is again moved out of engagement with the contact 40 and into engagement with the contact 39, thereby completing an energizing circuit for the winding 22 which may be traced from the positive control bus 46 through the conductor 47, the controller segments 48 and 49, the conductors 54 and 57, the contacts of the auxiliary relay 42, the conductors 56 and 51, the contacts 37 and 39, the conductor 58 and the winding 22 to the negative control bus 53. Upon energization of the winding 22, the field controlling contactor 15 moves to its upper position to open the short-circuit around the reactance 23 and complete a short-circuit around the resistance 24 to thereby alter the phase relationship of the interpole field currents.

The motor 10 may now be accelerated to its final running position without further change in the control circuits. It will be apparent that as the speed of the motor 10 varies above or below the predetermined speed at which the relay 27 is adjusted to shift the interpole field excitation, the relay 27 will operate between its two positions to energize or deenergize the winding 22 and thereby shift the phase relationship of the interpole field excitation accordingly. Beyond this point, however, our control system is not reversible.

When the controller 26 is returned to its "off" position, the controller segments 48 and 49 are effective to open the circuit from the positive control bus 46, and the various control devices return to the normal positions shown in the drawing.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A control system for an energy translating device comprising a two-position relay responsive to a predetermined operating condition of said device, means responsive to operation of said relay for changing the setting of said relay whereupon said relay returns to normal position for a second operation upon the occurrence of a second predetermined operating condition, a plurality of control devices, and means selectively responsive to successive operations of said relay for operating said control devices in sequence.

2. A control system for an energy translating device comprising a relay responsive to a predetermined operating condition of said device, said relay having a movable element normally biased to one of two positions, means responsive to an operation of said movable element for changing the setting of said relay whereupon said movable element returns to said biased position for a second operation upon the occurrence of a second predetermined operating condition, a plurality of control devices, and means selectively responsive to successive operations of said relay for operating said control devices in sequence.

3. A control system for an energy translating device comprising a two-position relay, means for energizing said relay in accordance with an operating characteristic of said device, means responsive to an operation of said relay at a predetermined condition of said device for changing the impedance of said energizing means, whereby said relay is returned to normal position and rendered responsive to a second predetermined condition of said device, a plurality of control devices, and means selectively responsive to successive operations of said relay for operating said control devices in predetermined sequence.

4. A control system for an energy translating device comprising a two-position relay provided with an operating winding energizable in accordance with an operating characteristic of said device, an impedance arranged to be connected in circuit with said winding, means responsive to an operation of said relay at a predetermined condition of said device for inserting said impedance in circuit with said winding to render said relay responsive to another predetermined condition of said device, means for returning said relay to normal position when said impedance is inserted in said winding circuit, a plurality of control devices and means selectively responsive to successive operations of said relay for operating said control devices in predetermined sequence.

5. A control system for an energy translating device comprising a relay having a winding energized in accordance with an electrical characteristic of said device, an operating element for said relay movable between two positions, means for biasing said operating element to one of said two positions, a plurality of control devices for controlling said energy translating device, means responsive to an operation of said element to its second position for actuating one of said control devices, means responsive to said actuation of said one control device for changing the setting of said relay whereby said movable element is returned to said biased position, and means responsive to a second operation of said movable element for actuating another of said controlling devices.

6. A control system for an energy translating device comprising a plurality of control devices, a two-position relay responsive to a predetermined operating condition of said energy translating device, means responsive to an operation of said relay for actuating one of said control devices, means responsive to an actuation of said one control device for changing the setting of said relay whereupon said relay is returned to its normal position, means responsive to a second actuation of said relay at another predetermined condition of said translating device for actuating another of said control devices, and means for preventing actuation of said two control devices out of sequence.

7. A control system for an energy translating device comprising a plurality of control devices, a two-position relay provided with an operating winding connected for energization in accordance with an electrical characteristic of said translating device, means responsive to an operation of said relay at a predetermined condition of said translating device for actuating one of said control devices, an impedance arranged to be connected in circuit with said operating winding, means responsive to said actuation of said one control device for inserting said impedance in said operating winding circuit to change the setting of said relay, means for returning said relay to normal position when said relay setting is changed, means responsive to a second actuation of said relay at another predetermined condition of said translating device for actuating another of said control devices, and means for preventing actuation of said control devices out of sequence.

8. A control system for an electric motor comprising a two-position relay energizable in accordance with the armature voltage of said motor, whereby said relay is responsive to the speed of said motor, means responsive to an operation of said relay at a predetermined motor speed for changing the setting of said relay, means for returning said relay to its normal position for a second operation at another predetermined motor speed, a plurality of control devices for controlling said motor, and means selectively responsive to successive operations of said relay for operating said control devices in predetermined sequence.

9. A control system for a motor having a plurality of field windings comprising control means for two of said windings, a two-position relay provided with an operating winding energizable in accordance with an electrical characteristic of said motor whereby said relay is responsive to a predetermined motor condition, means responsive to an operation of said relay when said motor attains said predetermined condition for actuating one of said field control means, means actuated by said one control means for rendering said relay responsive to a second predetermined condition of said motor, and means responsive to a second actuation of said relay for actuating said other field control means.

10. A control system for a motor having a plurality of field windings comprising control means for two of said windings, a relay provided with an operating winding energizable in accordance with an electrical characteristic of said motor whereby said relay is responsive to a predetermined motor condition, means responsive to an operation of said relay when said motor attains said predetermined condition for actuating one of said field control means, an impedance arranged to be connected in circuit with said operating winding, means actuated by said one control means for inserting said impedance in said operating winding circuit to render said relay responsive to a second predetermined motor condition, and means responsive to a second operation of said relay when said motor attains said second predetermined condition for actuating said other field control means.

11. A control system for a motor having a plurality of field windings comprising control means for two of said windings, a split-phase shaded pole induction relay energizable in accordance with an electrical characteristic of said motor, said electrical characteristic varying as the speed of said motor whereby said relay is responsive to a predetermined motor speed, means responsive to an operation of said relay at said predetermined motor speed for actuating one of said field control means, means actuated by said one control means for rendering said relay responsive to a second predetermined motor speed, and means responsive to a second operation of said relay at said second predetermined motor speed for actuating said other field control means.

12. A control system for a motor having a plurality of field windings comprising control means for two of said windings, a split-phase shaded pole induction relay having an operating winding energizable in accordance with an electrical characteristic of said motor, said characteristic varying as the speed of said motor whereby said relay is responsive to a predetermined motor speed, means responsive to an operation of said relay at said predetermined motor speed for actuating one of said field control means, an impedance arranged to be connected in circuit with said operating winding, means actuated by said one field control means for inserting said impedance into said operating winding circuit to vary the energization of said winding whereby said relay is rendered responsive to a higher predetermined motor speed, and means responsive to a second operation of said relay at said predetermined higher motor speed for actuating said other field control means.

13. A control system for a motor having an exciting field winding and an interpole winding, comprising a shunt for said exciting winding, means for disconnecting said shunt, a shunt for said interpole winding including a resistance and a reactance, means for selectively short-circuiting said resistance or said reactance to vary the impedance of said interpole shunt, means for energizing said motor to accelerate the same, a split-phase shaded pole induction relay provided with an operating winding, said winding being connected for energization in accordance with an electrical characteristic of said motor varying as the speed of said motor, said relay being responsive to a predetermined motor speed, means responsive to an operation of said relay at said predetermined motor speed for actuating said disconnecting means to remove said exciting field shunt, an impedance arranged to be connected in circuit with said relay operating winding, means actuated by said disconnecting means for inserting said impedance into said operating winding circuit to vary the energization of said winding whereby said relay is rendered responsive to a higher predetermined motor speed, and means responsive to a second operation of said relay at said predetermined higher motor speed for actuating said selective means to vary the impedance of said interpole shunt.

14. In a control system for an electric motor, a relay having an operating element, an operating winding for said relay energizable in accordance with an electrical characteristic of said motor, means for biasing said operating element against movement until said motor attains a predetermined condition, means responsive to an operation of said relay at said predetermined condition for decreasing the energization of said operating winding whereby said biasing means returns said operating element to its biased position and said relay is rendered responsive to a predetermined second motor condition.

15. In a control system for an electric motor, a relay having an operating element, an operating winding for said relay energizable in accordance with an electrical characteristic of said motor, said characteristic varying as the speed of said motor, means for biasing said operating element to prevent movement thereof below a predetermined motor speed, an impedance arranged to be connected in circuit with said operating winding, means responsive to an operation of said relay at said predetermined motor speed for inserting said impedance into said winding circuit to decrease the energization of said winding whereby said operating element is returned by said biasing means to its biased position and said relay is rendered responsive to a predetermined higher speed.

16. A control system for an energy translating device comprising a relay responsive to a predetermined operating condition of said device having a pair of fixed contacts and a switch member movable therebetween biased to provide a pair of normally closed contacts and a pair of normally open contacts, said normally open contacts being ineffective when closed upon initial operation of said relay, a plurality of control devices, an auxiliary relay, means responsive to initial opening of said normally closed contacts for operating one of said control devices and for partially completing an energizing circuit for said auxiliary relay, means also responsive to said initial opening for changing the setting of said relay whereupon said relay returns to normal position for a second operation at another predetermined operating condition, said normally closed contacts being effective when said relay returns to normal position to energize said auxiliary relay to prepare a circuit for subsequent closure by said normally open contacts, and means responsive to closure of said circuit by said normally open contacts at said second predetermined operating condition for actuating another of said control devices.

17. A control system for a motor having an exciting field winding and an interpole field winding, comprising a shunt for said exciting winding, means for disconnecting said shunt, a shunt for said interpole winding including a resistance and a reactance, means for selectively short-circuiting said resistance or said reactance to vary the impedance of said interpole shunt, a relay responsive to a predetermined speed of said motor having a pair of fixed contacts and a switch member movable therebetween biased to provide a pair of normally closed contacts and a pair of normally open contacts, said normally open contacts being ineffective when closed upon initial operation of said relay, an auxiliary relay associated with said speed responsive relay, means responsive to opening of said normally closed contacts upon initial operation of said relay for operating said field disconnecting means and for partially completing an energizing circuit for said auxiliary relay, means also responsive to said opening of said normally closed contacts for changing the setting of said relay whereupon said switch member returns to normal position for a second operation at a predetermined higher motor speed, said normally closed contacts being effective when said switch member returns to normal position to energize said auxiliary relay thereby to prepare a circuit for subsequent closure by said normally open contacts, and means responsive to closure of said circuit by said normally open contacts at said second predetermined speed for actuating said selective means to vary the impedance of said interpole shunt.

JACOB W. McNAIRY.
HAROLD G. MOORE.